United States Patent [19]
Takatori et al.

[11] Patent Number: 5,355,437
[45] Date of Patent: Oct. 11, 1994

[54] NEURAL NETWORK ARCHITECTURE FOR PATTERN RECOGNITION

[75] Inventors: Sunao Takatori; Makoto Yamamoto, both of Tokyo, Japan

[73] Assignee: Yozan Inc., Tokyo, Japan

[21] Appl. No.: 22,438

[22] Filed: Feb. 16, 1993

Related U.S. Application Data

[63] Continuation of Ser. No. 703,746, May 21, 1991, abandoned.

[30] Foreign Application Priority Data

May 21, 1990 [JP] Japan .................................. 2-129155
Jun. 4, 1990 [JP] Japan .................................. 2-145986

[51] Int. Cl.$^5$ ............................................. G06K 9/66
[52] U.S. Cl. ...................................... 395/24; 382/14; 395/21
[58] Field of Search ................. 395/21, 22, 24; 382/14

[56] References Cited

U.S. PATENT DOCUMENTS

| | | | |
|---|---|---|---|
| 4,760,604 | 7/1988 | Cooper et al. | 382/15 |
| 5,058,179 | 10/1991 | Denker et al. | 382/14 |
| 5,067,164 | 11/1991 | Denker et al. | 382/15 |

OTHER PUBLICATIONS

Rumelhart et al., Parallel Distributed Processing, vol. I, Foundations, MIT Press, 1986, pp. 318–362.
Strong et al., "A Factored Architecture to Solve Illusory Conjunctions in Neural Networks", IEEE First Intl. Conf. on Neural Networks, Jun. 1987, pp. II-463-470.
Vogl et al., "Accelerating the Convergence of the Back-Propagation Method", Biological Cybernetics 59, 1988, 257–263.
Cortes et al., "A Network System for Image Segmentation", IJCNN, Jun. 1989, pp. I-121-125.
Le Cun et al., "Handwritten Digit Recognition: Applications of Neural Network Chips and Automatic Learning", IEEE Communications Mag., Nov. 1989, pp. 41–46.
Martin et al., "Recognizing Hand-Printed Letters and Digits Using Back Propagation Learning", Neural Computation 3, 1991, pp. 258–267.
Le Cun et al., "Optical Character Recognition and Neural-Net Chips", Intl. Neural Network Conf., Jul. 1990, 651–655.
Lippmann, R. P., "Pattern Classification Using Neural Networks", IEEE Communications Mag., Nov. 1989, 47–64.
Moody et al., "Learning with Localized Receptive Fields", Proc. 1988 Connectionist Model Summer School, 133–143.
Johnson et al., "Feature Extraction in the Neocognitron", IEEE Intl. Conf. on Neural Networks, Jul. 1988, II-117-126.
Hecht–Nielsen, "Kolmogorov's Mapping Neural Network Existence Theorem", Maureen Caudill and Charles Butler: IEEE First International Conference on Neural Networks San Diego, California, Jun. 21–24, 1987, vol. III, The Institute of Electrical and Electronics Engineers, Inc., pp. III-11 to III-14.

*Primary Examiner*—Robert W. Downs
*Attorney, Agent, or Firm*—Cushman, Darby & Cushman

[57] ABSTRACT

A data processing system according to the present invention provides a plurality of neural layers with neuron groups, each neuron group having a fixed number of neurons. The neurons of the neuron group each have an output coupled to a neuron of an adjacent neuron layer. Each neuron layer has a plurality of neuron groups, and each neuron group has at least one neuron which also belongs to another neuron group, resulting in an overlap in the neuron groups. The number of neurons in the nth neural layer is determined on the basis of the number of neurons in the (n−1)th layer, the size of the neuron groups, and the degree of overlap between the adjacent neuron groups. In a variation of the data processing system of the present invention, the data processing system comprises a plurality of mutually independent data processing portions, each of which comprises a plurality of neural layers.

2 Claims, 6 Drawing Sheets

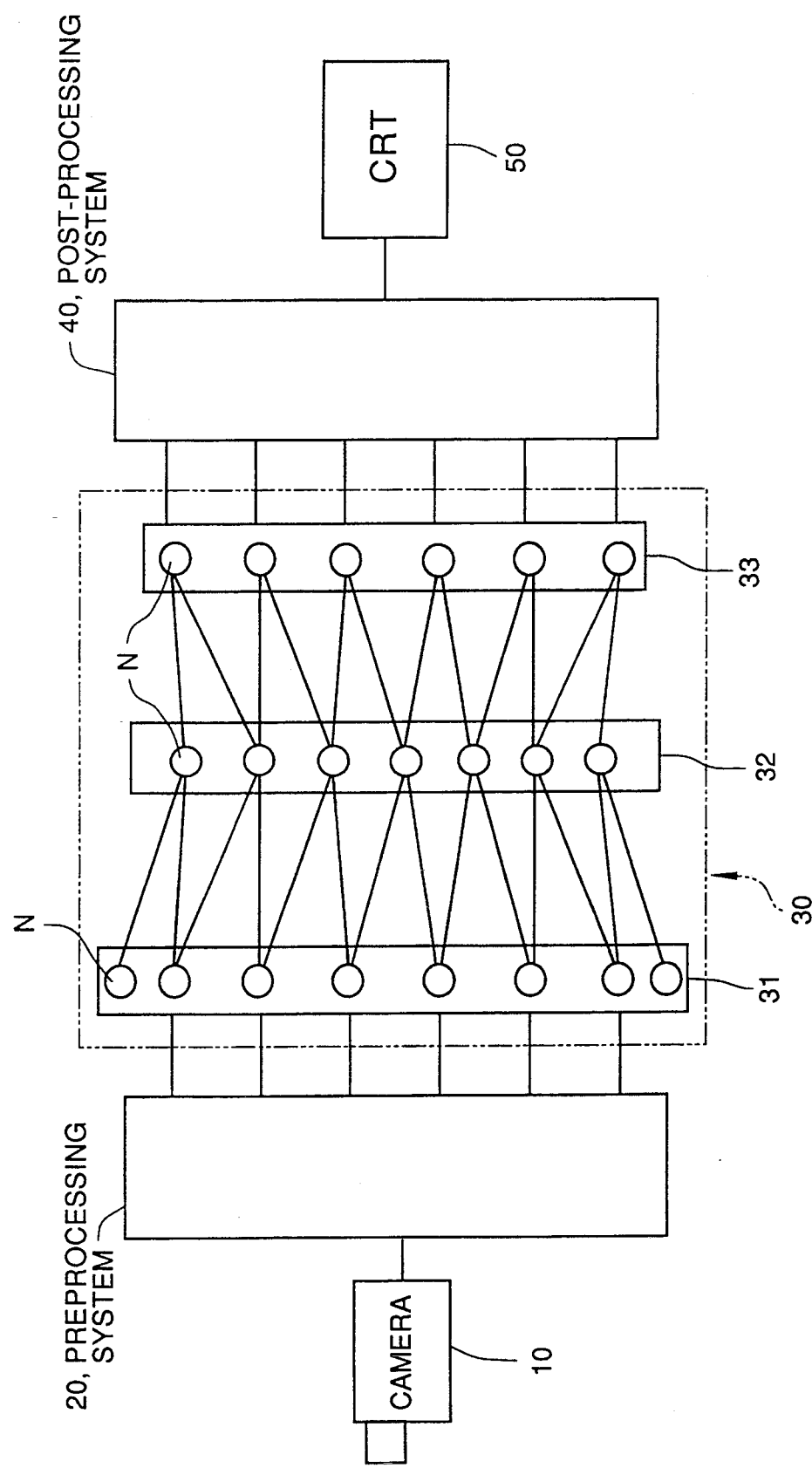

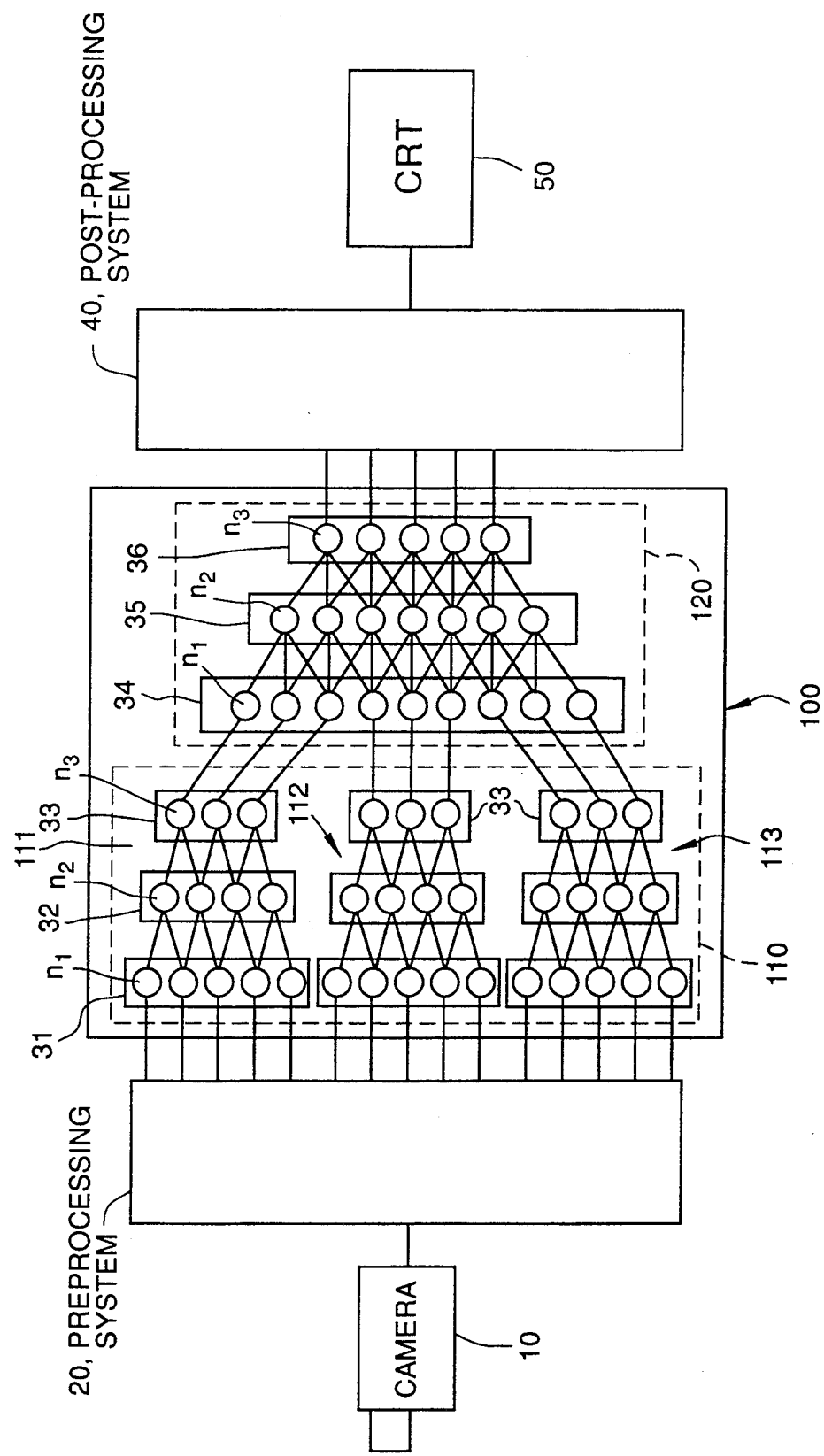

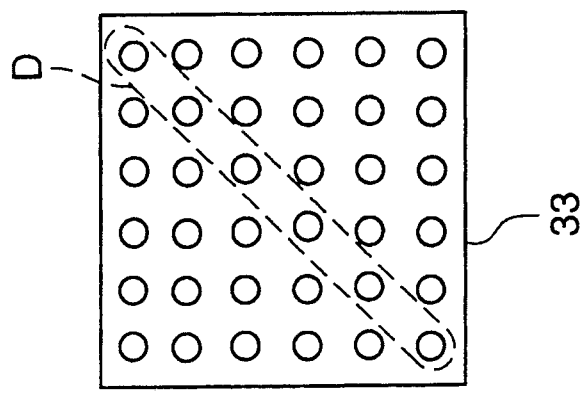
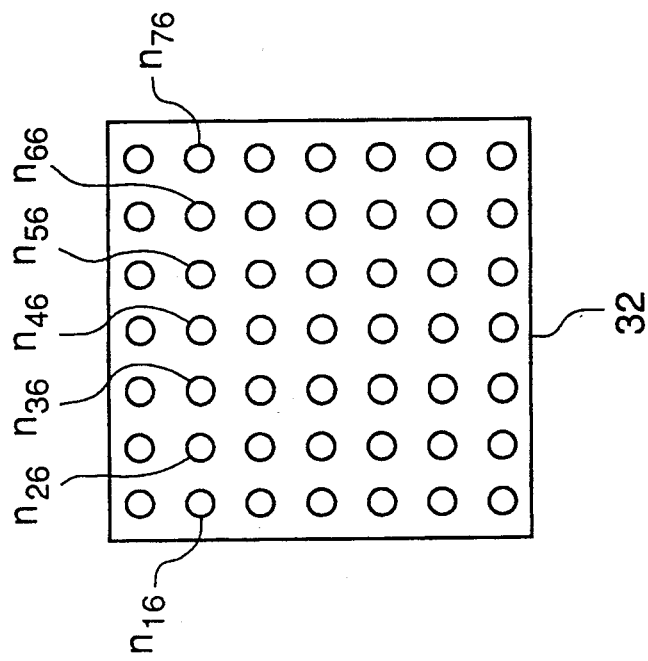
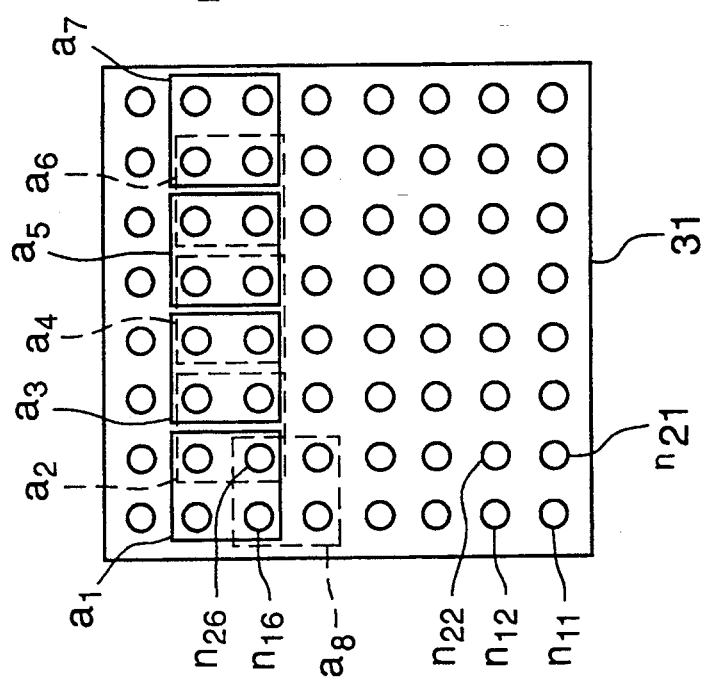

NEURAL NETWORK ARCHITECTURE FOR PATTERN RECOGNITION

This is a continuation of application Ser. No. 07/703,746, filed on May 21, 1991, which was abandoned upon the filing hereof.

BACKGROUND OF THE INVENTION

1. Field of the Invention

The present invention relates to a data processing system based on the concept of the neural network.

2. Description of the Related Art

The neural network according to a data processing system of this type is structured with layers by preparing a plurality of neuron models 5 (hereinafter called "neuron"), shown in FIG. 1, in a parallel configuration. Neurons in each layer are connected via their respective synapses to all neurons in other adjacent layers, so as to input and output data. According to neuron 5, data O is output in accordance with the compression result between the sum of multiplied input data from outside I1, I2, I3 . . . In by weights W1, W2, W3 . . . Wn and threshold Θ.

Various compression methods are possible. For example, when the normalization function 1[f] is applied, output data O is expressed as follows:

$$O = 1[\Sigma W_n \cdot I_n - \Theta] \tag{1}$$

That is, when $\Sigma W_n \cdot I_n$ exceed the threshold Θ, the neuron ignites so that output data O becomes "1"; and when $\Sigma W_n \cdot I_n$ is smaller than threshold Θ, output data becomes "0".

A conventional neural network is structured to form neural layers by preparing such neurons 5 in parallel and connecting the above neural layers in series. A neural layer may, for example, comprise 3 layers: an input layer, a middle layer and an output layer. Such a neural layer is proposed by Rosenblatt and described as Perceptrons, in which neurons of each layer have their respective synapses connected to all the neurons of an adjacent layer.

According to the data processing system of this type, it is necessary to prepare a plurality of neurons in an input layer for the processing of input data. However, comparatively few neurons are necessary in an output layer since in practice they simply output the processing result. Conventionally, no specific theory was established with respect to the method for deciding the number of neurons in the middle layer, so that the equal numbers of neurons for all neural layers were normally prepared. Therefore, a problem arose that all neurons are not efficiently used due to the enormous number of neurons.

SUMMARY OF THE INVENTION

The present invention solves the above problems of the prior art and has an object to provide a data processing system comprising the minimum necessary number of neurons for the processing objects.

The present invention provides a data processing system having a plurality of neural layers, each of which has a plurality of neurons. Each of the neurons of the present invention outputs predetermined data during neuron ignition in response to input data, whereby the ignition pattern is in accordance with predetermined processing results.

The neurons in a neural layer of each data processing portion are divided into neuron groups, each neuron group having a fixed number of neurons.

The neuron groups define the relationships of the neurons of a neural layer with adjacent layers. Each neuron group of a neural layer includes neurons which belong to an adjacent neuron group, in the same neural layer, at the same time. In addition, neurons in each neuron group correspond to neurons in the following neural layer, respectively.

The number of neurons $N_n$ in the nth neural layer can be calculated by the following formula:

$$N_n = [(\sqrt{N_{n-1}} - v)/(\sqrt{a} - v)]^2$$

where, "$N_{n-1}$" is the number of neurons at (n−1)th layer; "a" is the number of neurons in one neuron group; and "v" is the number of strings that belong to another adjacent neuron group.

In a second embodiment of the present invention, the neural layers are arranged into a plurality of mutually independent data processing portions. Each of the mutually independent data processing portions include the neural layers which have the neurons arranged into neuron groups. Therefore, the second embodiment of the present invention enables processing of more complex patterns and images.

BRIEF DESCRIPTION OF THE DRAWINGS

FIG. 2 shows a schematic structural diagram of a character recognition system according to a first embodiment of the present invention;

FIG. 3 shows a schematic structural diagram of a character recognition system according to a second embodiment of the present invention;

FIGS. 5(a), (b) and (c) show the schematic drawing of neurons in input layer, middle layer and output layer, respectively, of the first and second embodiments;

DETAILED DESCRIPTION OF THE PREFERRED EMBODIMENTS

Figure 1:
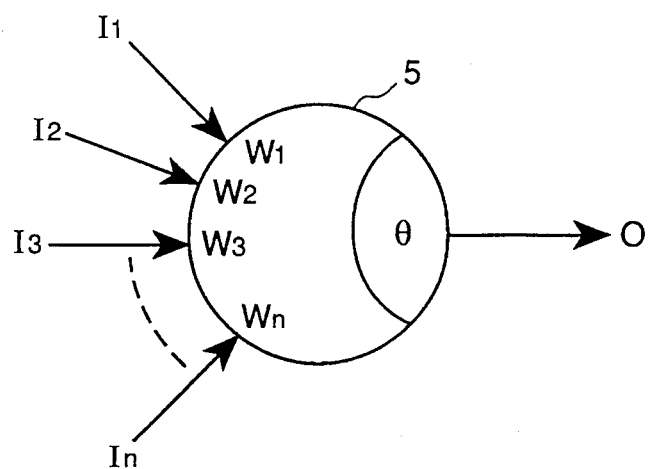
FIG. 1 shows a schematic drawing indicating an embodiment of a conventional neuron.

Hereinafter, the present invention is described according to the preferred embodiments referring to the accompanying drawings.

FIG. 2 shows a character recognition system comprising a data processing system according to an embodiment of the present invention.

This character recognition system comprises a video camera 10, a preprocessing system 20, data processing system 30, post-processing system 40 and a display 50. A video camera 10 is prepared for inputting characters and is connected to a preprocessing system 20. A preprocessing system 20 is, for example an image processing system, generally and conventionally known, that performs the filtering processing of the input character data and binarizes the data as well as extracts the characteristics data of the input character (for example, number of end points, number of branch points, etc.); the preprocessing system 20 outputs this characteristics data to a data processing system 30. The data processing system 30 includes the neural network, described later, and recognizes an input character from the preprocessing system 20 with respect to its characteristics data, then outputs recognition data as a data processing system signal to a post-processing system 40 according to the above recognition result.

Recognition data from the data processing system 30 signal is, for example, a character code. A post-processing system 40 stores the recognition data output from the data processing system 30 as, for example, a data of word processor, and outputs it to a display 20, simultaneously. Display 50 is, for example, a CRT, and displays the character recognized by the data processing system 100 as an image.

The neural network of the data processing system 30 is structured, for example, as a part of hardware. The data processing system 30, as shown in FIG. 2, comprises 3 neural layers: an input layer 31, a middle layer 32 and an output layer 33, in which middle layer 32 is arranged between input layer 31 and output layer 33. According to the present embodiment, each layer 31, 32 and 33 comprise a plurality of neurons n, respectively, in which neurons n of input layer 31 are connected to all neurons n of middle neural layer 32, and neurons n of middle neural layer 32 are connected to all neurons n of output layer 33.

FIG. 3 shows a data processing system according to a second embodiment of the present invention. The second embodiment, as shown in FIG. 3, also includes a camera 10, a preprocessing section 20, a post-processing system 40 and an output device, such as CRT 50. However, a processing system 100 is substituted for the processing system 30 of the first embodiment. Similar to the first embodiment, the neural network of the data processing system 100 is structured, for example, as a part of hardware. However the data processing system 100, as shown in FIG. 3 comprises a preprocessing portion 110 and post-processing portion 120. Preprocessing portion 110 actually comprises nine (9) data processing portions, as it is described later, however, only three (3) data processing portions 111, 112 and 113 are shown in FIG. 3. On the other hand, post-processing portion 120 comprises one data processing portion.

Each data processing portion, according to the second embodiment, comprises three (3) neural layers. The structure of the data processing portion is described while referring to the data processing portion 111. The data processing portion 111 comprises three (3) neural layers: input layer 31, middle layer 32 and output layer 33, in which middle layer 32 is arranged between input layer 31 and output layer 33. Each layer 31, 32 and 33 comprises a plurality of neurons n, in which the neurons $n_1$, of input layer 31 are connected to all the neurons $n_2$ of middle layer 32, and the neurons $n_2$ of middle layer 32 are connected to all the neurons $n_3$ of output layer 33. The structures of other data processing portions, such as the data processing portions 112 and 113, as well as post-processing portion 120, are similar to the data processing portion 111. The post-processing portion 120 comprises input layer 34, middle layer 35 and output layer 36. Neurons $n_1$ of input layer 34 are connected to all the neurons $n_2$ in the middle layer 35, and the neurons $n_2$ of the middle layer 35 are connected to all the neurons $n_3$ of output layer 36. The number of neurons in the input layer 34 of post-processing portion 120 is equivalent to the total number of neurons in all the output layers 33 of preprocessing portion 110. A neuron $n_3$ of each output layer 33 is connected to one of the neurons $n_1$ in input layer 34.

Figure 4:
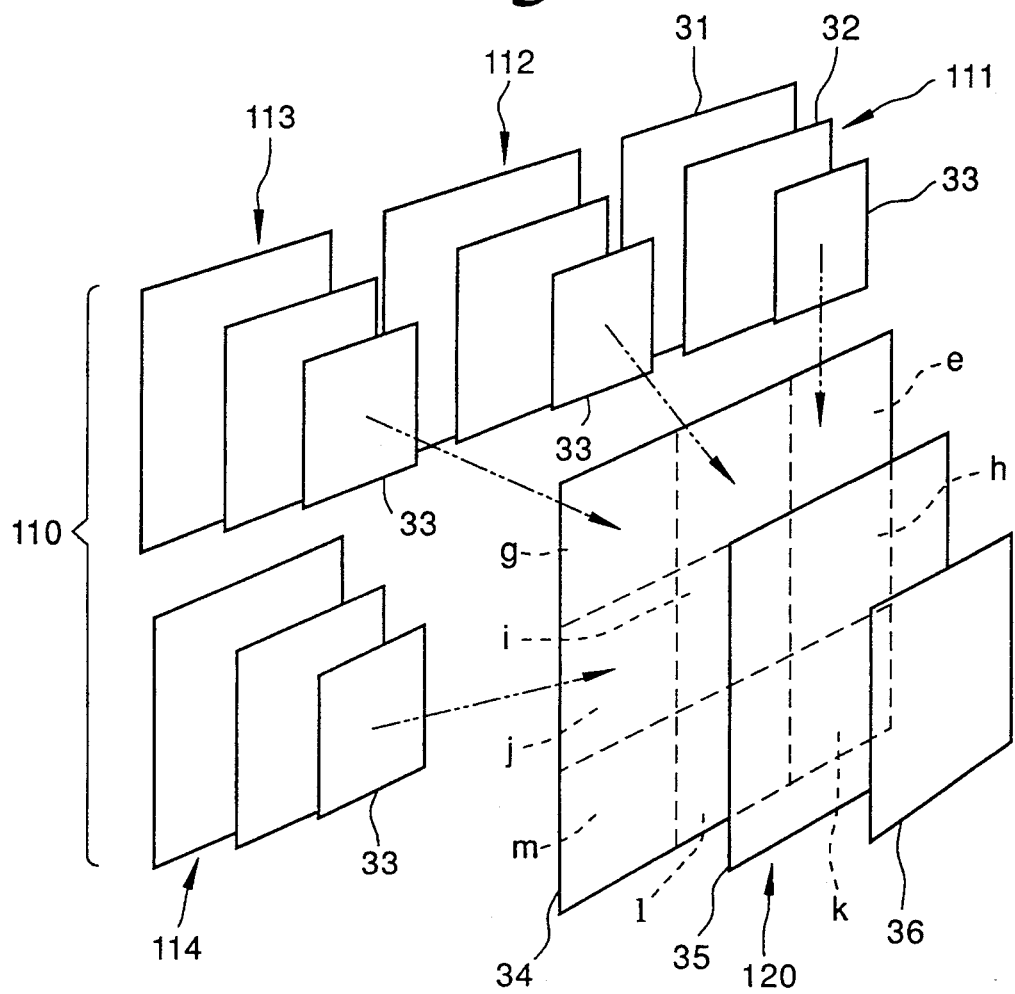
FIG. 4 illustrates the structures of the preprocessing and post-processing portions of the data processing system of FIG. 3.

FIG. 4 shows a perspective view of the structures of preprocessing portion 110 and post-processing portion 120. According to the present embodiment, preprocessing portion 110 actually comprises nine (9) data processing portions, as described above; however, only four (4) data processing portions 111, 112, 113 and 114 are shown in FIG. 4 for convenience. Also, as described above, each neuron in output layer 33 of each data processing portion of preprocessing portion 110 is connected to one neuron in input layer 34 of post-processing portion 120, respectively. In other words, neurons in output layer 33 of preprocessing portion 110 and neurons in input layer 34 of post-processing portion 120 perfectly correspond to each other. Input layer 34 of post-processing portion 120 is divided into the same number of areas e, f, g, h, i, j, k, l and m, as the number of data processing portions of preprocessing portion 110 (as to the present embodiment, it is 9). Each of the areas of the input layer 34 corresponds to corresponding output layers 33 of the data processing portions 111, 112, 113 and 114 of preprocessing portion 110, respectively.

Each neuron n of the first and second embodiments outputs either a "1" or "0" according to the formula (1) of the normalization function, as it is described with reference to FIG. 1. Neuron n is implemented, for example, by operation amplifiers. The weight Wn to be multiplied to a data input to each neuron n is obtained, for example, by a variable resistance connected to an input terminal of an operation amplifier. The threshold function $\Theta$ is realized by, for example, switching elements. Accordingly, weight Wn is changed and output data is connected by changing the variable resistance with respect to the output data of each neuron, so as to perform the learning control.

FIGS. 5(a), (b) and (c) show a typical input layer 31, middle layer 32 and output layer 33, respectively, of the neural network 30 and the preprocessing portion 110 of the first and second embodiments, respectively. As shown in FIGS. 5(a), 5(b), and 5(c), input layer 31, middle layer 32 and output layer 33 have a successive decrease in numbers of neurons. Here, the numbers of neurons in input layer 31, middle layer 32 and output layer 33 are determined for ease of explanation to be 64, 49 and 36, respectively, in which $8 \times 8$ neurons, $7 \times 7$ neurons and $6 \times 6$ neurons in both vertical and horizontal directions are respectively arranged. Also, the location of a neuron at the lower left corner in FIGS. 5(a)–(c) is determined as an origin, and a neuron at the ith and jth location from left and from down, respectively, is determined as nij.

Each neuron of input layer 31 ignites with respect to characteristics data of characters input through the video camera 10. For example, it is deemed in the first embodiment that the number of end points is expressed by the ignition pattern of neurons n11, n12, n21 and n22, and that the number of branch points is expressed by the ignition patterns of neurons n13, n14, n23 and n24. According to the second embodiment, for example, it is deemed that an Euler number is expressed by ignition patterns of neurons n11, n21 ... n82. Accordingly, the ignition pattern of neurons of input layer 31 according to the present invention is predetermined, or artificially selected, in accordance with an input character.

On the other hand, at the output layer 33, a character is expressed in the first embodiment, and a numerical value is expressed in the second embodiment, for example, by neurons nii along a diagonal line D including the neurons at the lower left corner and upper right corner. Accordingly, neurons on the diagonal line D express the character codes for a character for the first embodiment. The ignition pattern of the neurons of the output layer 33 is determined artificially. According to the first embodiment, there are sixty four (64) possible ignition patterns along the diagonal line D, so that there are sixty four kinds of characters that can be recognized, such as characters.

Similarly, the neurons nii along the diagonal line D express numerical values from 1 to 64 for the second embodiment. These numerical values indicate clustering results, for example clusters of characters input from a video camera 10 by the predetermined method, as it will be described later.

According to the second embodiment, although the structures of input layer 34, middle layer 35 and output layer 36 of post-processing portion 120 are similar to those of input layer 31, middle layer 32 and output layer 31 of preprocessing portion 110, respectively, the functions of these layers of the post-processing portion 120 are different. According to post-processing portion 120, clusters with respect to input characters are input to input layer 34 from preprocessing portion 110, and character codes with respect to input characters are output from output layer 36. These character codes represent the recognition data of the data processor 100 and are expressed by, for example, neurons on a diagonal line connecting neurons at lower left corner and lower right corner, as shown in FIG. 5(c).

As will be described later, many quantities of variable analysis are performed at each data processing portion of preprocessing portion 110. The clustering data with respect to the many quantities of variable analysis is input to post-processing portion 120, so as to perform many quantities of variable analysis, then character recognition.

The corresponding relationship among neurons in each neural layer according to the present invention will now be described.

Neurons in each layer are divided into neuron groups with a fixed number of neurons. According to the first and second embodiments, one neuron group comprises four (4) neurons. Referring to input layer 31, shown in FIG. 5(a), neuron group a1, for example, comprises neuron n16, n26, n17 and n27; and neuron group a2 comprises neurons n26, n36, n27 and n37. Similar to the above, neuron groups a3, a4, a5, a6 and a7 can be defined by shifting one neuron column to the right, successively. Each neuron group a1 to a7 of the input layer 31 corresponds to neuron n16, n26, n36, n46, n56, n66 and n76 in middle layer 32, respectively. That is, a neuron group in input layer 31 corresponds to a neuron in middle layer 32, whereby the middle layer neuron has the same coordinates as the neuron at the lower left corner of the corresponding neuron group in input layer 31. For example, neuron group a1 of the input layer 31 corresponds to neuron n16 of the middle layer 32.

Similar to the above, neurons in middle layer 32 are also divided into neuron groups each of which comprises four (4) neurons. Each neuron group of layer 32 corresponds to a neuron in output layer 33 in the same manner as is described above for the neuron groups of the input layer 31.

As is understood from FIG. 5(a), each neuron group includes neurons which belong to an adjacent neuron group at the same time. For example, neurons n26 and n27 of neuron group a1 also belong to neuron group a2 which is located next to neuron group a1. Neurons n16 and n26 of neuron group a1 also belong to neuron group a8 which is located below the neuron group a1. Therefore, each neuron group overlaps to the adjacent neuron groups.

Figure 6:
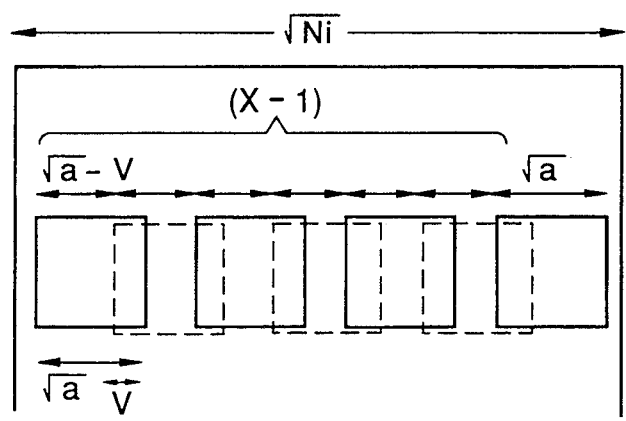
FIG. 6 shows a drawing describing the overlapping relationships among each neuron group.

Assume the following definitions: "$N_i$" is the number of neurons in input layer 31; "a" is the number of neurons of a neuron group in input layer 31; "v" is the number of neuron strings belonging to another adjacent neuron group (in other words, the width of neuron group overlap as measured by the number of neurons along one axis being member of adjacent neuron groups); and "x" is the number of neuron groups in one row of the input layer 31. As a result, the relationship between the neuron groups, as shown in FIG. 6, is expressed as:

$$(\sqrt{a} - v) \cdot (x - 1) + \sqrt{a} = \sqrt{N_i}$$

Therefore, $$x = (\sqrt{N_i} - v)/(\sqrt{a} - v)$$

Here, each numerical value $N_i$, a, and v should be selected so that x becomes an integer. For example, referring to FIG. 5(a), the values are $N_i = 64$, a=4, v=1 and x=7. According to a numerical value a, however, it is possible to determine the number of neurons of a neuron group located at the corners of a layer to be different to that of the other neuron groups.

Since each neuron group in input layer 31 perfectly corresponds to each neuron of middle layer 32, the number of neuron groups in input layer 31, x, is equal to the number of neurons in middle layer 32. Therefore, the total number of neurons in middle layer 32, $N_m$, is calculated as follows:

$$N_m = [(\sqrt{N_i} - v)/(\sqrt{a} - v)]^2 \qquad (2)$$

The above relationship can be generalized such that the number of neurons $N_n$ in the nth neural layer is:

$$N_n = [(\sqrt{N_{n-1}} - v)/(\sqrt{a} - v)]^2 \qquad (3)$$

where, "$N_{n-1}$" is the number of neurons in (n−1)th neural layer. The number of neurons in the input layer 31 is determined according to the concepts of the processing for an input data. That is, in the case of character recognition, for example, the number of neurons in input layer 31 is determined with respect to the kinds of characteristics data of a character. On the other hand, the number of neurons in output layer 33 is determined according to the output contents.

According to a character recognition system as described above, the number of neurons according to the first embodiment is determined according to the kinds of character codes; however, according to the second embodiment, the number of neurons is determined according to clusters of characteristics data for the preprocessing portion 110, and character codes of characters for the post-processing portion 120. Therefore, in both the first and second embodiments the numbers of neurons in input layers 31, 34 and output layers 33, 36 are determined according to the processing contents of the present data processing system. On the other hand, the numbers of neurons in middle layers 32, 35 are determined, as it is indicated by the formula (2), according to the number of neurons in input layer 31 and the number of neurons in neuron group, etc. Of course, the relationship between the number of neurons in middle layers 32, 35 and output layers 33, 36, respectively is similar to the relationship between input layers 31, 34 and middle layer 32, 35, respectively, in accordance with the formula (3).

Although three (3) neural layers are prepared for both preprocessing portion 110 and post-processing portion 120, as shown in FIG. 2 and FIGS. 5(a) to (c), it is possible to have more than four (4) neural layers by preparing more than two (2) middle layers. Similarly, it is possible to have more than four (4) neural layers in the neural network of the data processing system 30. Hereinafter, the manner to decide the number of neural layers is described.

As is described above, the numbers of neurons in input layers 31 and 34, $N_i$, and in output layers 33 and 36, $N_o$, are determined according to an object of a data processing system, such as kinds of character codes (first embodiment), or the kinds of characteristic data of a character in the case of character recognition and the desired output contents (second embodiment). On the other hand, the number of neurons included in a neuron group, a, and the number of neuron strings belonging to another adjacent neuron group at the same time (in other words, the percentage of overlapping), v, are calculated on an experimental basis. For example, as shown in FIG. 5(a), if a is "4" and v is "1" the percentage of overlapping is 50% Once the number of neurons in input layer 31, Ni, number of neurons in a neuron group, a, and the percentage of overlapping, v, are determined, the number of neurons in the second layer (the first middle layer), N2, is determined by the formula (3). Then, number of neurons in the third layer (the second middle layer), N3, is also determined from the formula (3). The above calculation is continued for subsequent layers until the number of neurons in the nth layer is such that the nth layer becomes the middle layer at just before the output layers 33, 35.

Hereinafter, learning of character recognition according to the present invention is described with reference to the second embodiment. It will become apparent that the learning of character recognition described below can be similarly applied to the first embodiment, on the basis of the input characteristics data and the predetermined output contents.

According to the second embodiment, Euler number, area and number of groups are input as the characteristics data from preprocessing system 20 to the first data processing portion 111 to be clustered. The first data processing portion is for the judgment of input characters, such as alphanumeric, Chinese or Japanese hiragana characters, that belong to clusters with respect to Euler number, area and number of groups as the parameters; the result is to classify similar characters into the same cluster group. For example, "4" and "9" are classified into the same cluster group due to their similarity in appearance. Such clustering as above is possible from learning by inputting print characters from a video camera, as it will be described later.

Similar to the above, video parameters to be clustered, such as horizontal direction, vertical direction, stroke distribution of direction of right upward inclination and left upward inclination are input from preprocessing system 20 to the second data processing portion 112 to be clustered. Characteristics data such as number of branch points with three branches and four branches, and number of end points are input from preprocessing system 20 to the third data processing portion 113 to be clustered. Other data processing portions perform clustering with respect to predetermined characteristics data input from preprocessing system 20.

A neuron in each output layer 33 of preprocessing portion 110 will never ignite until learning of character recognition is performed, even if the character data is input to data processing system 30. This neuron becomes ignitable by learning. Learning will be completed when a neuron indicates the predetermined ignition pattern according to the input character data.

According to the above learning, each output layer 33 is initially connected to post-processing system 40 and the clustering result output from output layer 33 is indicated at CRT 50. As is described above, characters input from a video camera 10 are the print characters and clusters with respect to each characteristics data are predetermined for each print character. Accordingly, learning is continued until preprocessing portion 110 outputs predetermined clusters according to the input characters.

When learning is completed, input layer 31 and output layer 33 will indicate the artificially determined ignition pattern according to the input character data. Then, an assumption is made that the ignition pattern will smoothly change over each layer of input layer 31, middle layer 32, and output layer 33, successively. According to the present embodiment the weights of middle layer 32 and output layer 33 are changed, or adjusted, so that ignition pattern will smoothly change over those layers during the learning process. As it is described above, a data processing portion comprises as many number of middle layers as calculated by the formula (3) at the end of learning; however, it comprises only one middle layer at the beginning of learning.

After one middle layer 32 is prepared, the decision of whether the neurons in middle layer 32 should ignite or not is made, concerning the ignitions of a plurality of corresponding neurons in input layer 31 and output layer 33. When more than a predetermined percentage of neurons among a plurality of corresponding neurons in input layer 31 and output layer 33 ignite or should be ignited, a neuron in the middle layer 32 is determined to have a tendency to ignite, so that weights of the selected neurons in middle layer 32 and the corresponding neuron in output layer 33 is increased for the above ignitions. The above process is repeated for all neurons of the middle layer 32.

Figure 7C:
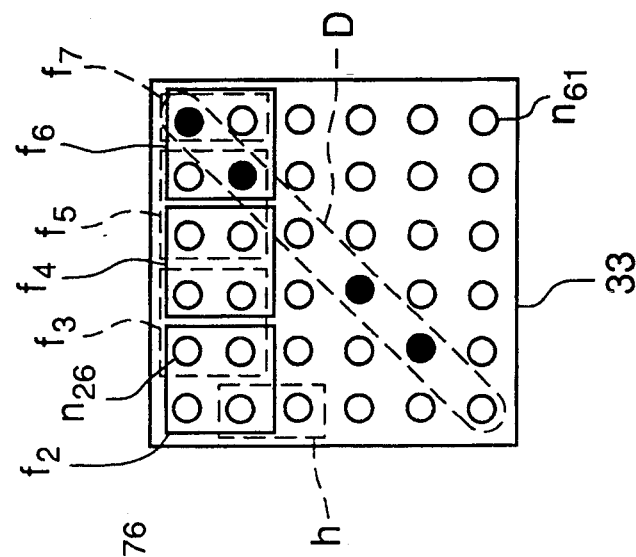
FIG. 7(a), (b) and (c) show the schematic diagrams indicating the ignition distributions of neurons with respect to input layer, middle layer and output layer, respectively.
Figure 7B:
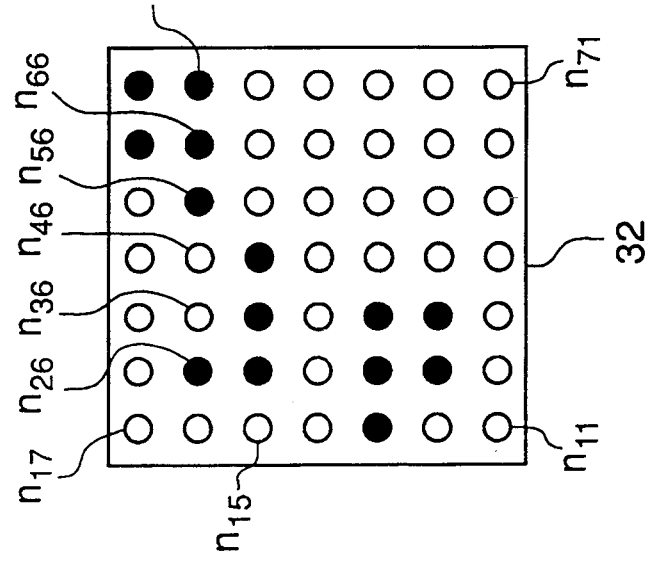
Figure 7A:
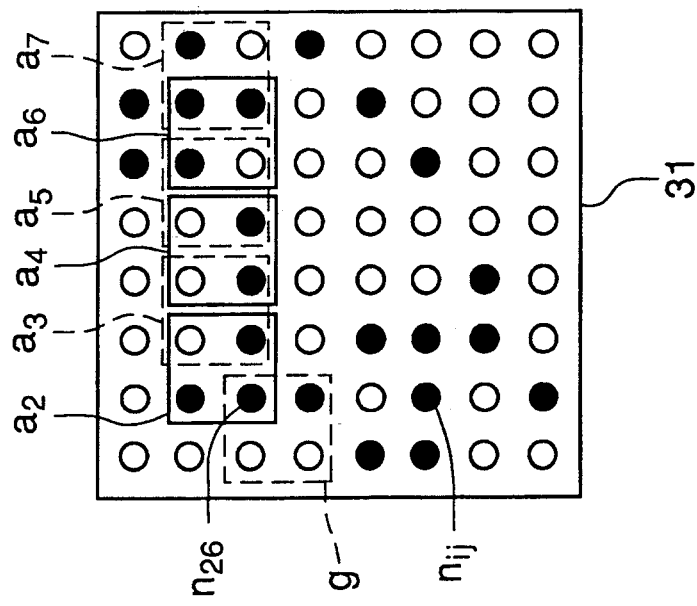

The determination manner of whether such neurons in middle layer should be ignited or not is described referring to FIGS. 7(a), (b) and (c). FIGS. 7(a), (b) and (c) show ignition patterns of input layer 31, middle layer 32 and output layer 33, respectively, whereby black circles indicate igniting neurons and white circles indicate neurons other than igniting neurons. According to this embodiment, input layer 31 in FIG. 7(a) expresses the ignition pattern as shown according to the characteristics data of a predetermined input character. Also, output layer 33 in FIG. 7(c) expresses the ignition pattern as shown so as to output clusters according to the characteristics data of the above character. Accordingly, the ignition pattern of input layer 31 in FIG. 7(a) is fixed with respect to the input character, and the ignition pattern of output layer 33 indicates the ignition pattern when learning is completed. On the other hand, the ignition pattern tendency of middle layer 32 will be determined according to the ignition patterns of input layer 31 and output layer 33, as will be described later.

The relationship among neurons in each layer when the tendency of the ignition pattern is determined, is similar to the relationship described with reference to FIGS. 5(a), (b) and (c). However, for middle layer 32, neurons located at corner positions n11, n71, n17 and n77 each correspond to four (4) neurons in input layer 31, respectively, and also correspond to neurons in output layer 33 located at corner n11, n61, n16 and n66, respectively. Also, neurons in middle layer 32 located on the outer edges ni1, ni7, n1j and n7j correspond to four (4) neurons in input layer 31, respectively as above, and to neurons $n(i-1)1$ and nil, and neurons $n6(j-1)$ and n6j in output layer 33, respectively.

According to the first and second embodiments, neurons in middle layer 32 are judged to have the tendency to ignite when, for example, more than 35% of a plurality of corresponding neurons in input layer 31 and output layer 33 ignite. As shown in FIG. 7(b), three neurons are igniting among corresponding neurons in input layer 31 and output layer 33 with reference to a neuron n26 in middle layer 32 (total 8 neurons in the areas a2 and f2). Therefore, neuron n26 in middle layer 32 is judged to have the tendency to ignite. On the other hand, two neurons are igniting among corresponding neurons in input layer 31 and output layer 33 with reference to a neuron n15 in middle layer 32 (total 6 neurons in the areas g and h). Therefore, neuron n15 in middle layer 32 is judged not to have the tendency to ignite. Accordingly, neurons in middle layer 32 are judged to have the tendency to express the ignition pattern as shown in FIG. 7(b).

According to character recognition learning of the present embodiment, the weight of each neuron in middle layer 32 and output layer 33 is increased by a predetermined value to obtain the desired ignition pattern.

Figure 8:
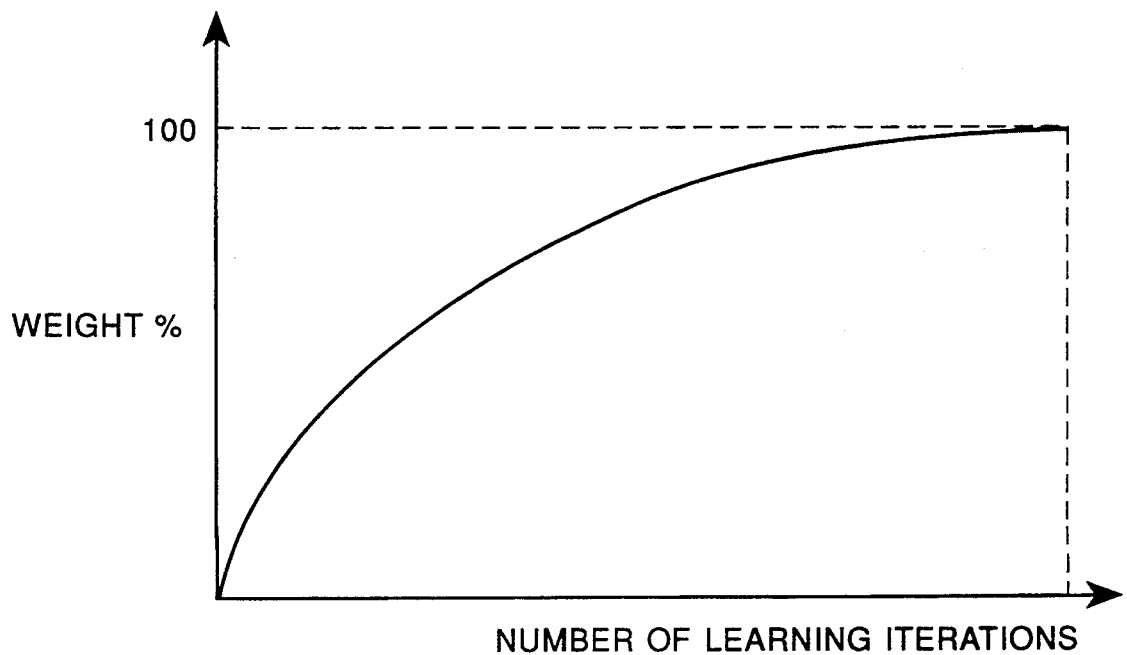
FIG. 8 shows a graph indicating the relationship between the number of learning iterations and change in weight.

Such a weight increase can be described with reference to FIG. 1 and FIG. 8. When output data O of a neuron 5 in the middle layer is the value at ignition (for example, "1"), the weights of the middle layer neuron synapses (in this case, "W2" and "W3") corresponding to data (for example, "I2" and "I3") input from the igniting neuron among neurons in the input layer are increased by, for example, 5%. Weights of synapses of neurons in the output layer 33 are processed in the same manner, so that weights of the output layer neuron synapses with respect to the neurons in middle layer that are determined to have ignited are increased by, for example, 5%.

Accordingly, weights in middle layer 32 and output layer 33 are increased so that the ignition pattern over layers of input layer 31, middle layer 32 and output layer 33 changes smoothly. Here, if each neuron in input layer 31 and output layer 33 is determined to ignite with the same frequency with respect to all input characters, ignition of each neuron in the middle layer will have an even distribution, so that each neuron of the middle layer will ignite at the same frequency. Thus, it is possible to prevent neuron ignition frequencies from falling into a local minimum. Furthermore, each neuron in middle layer 31 will ignite equally. That is, since it is possible to prevent the occurrence of neurons that do not ignite, the neurons of the middle layer 32 have a more the efficient performance. The increase in weight of a synapse according to one learning operation is varied as shown in FIG. 8, with respect to the number of learnings. Total learning is gradually performed after a plurality of learning operations, and minor adjustment for the small change is performed at the end of learning. Learning speed is heightened by the rapid increase in weight at the beginning of learning.

It will be recognized that the data to be processed by the neural network will be much more varied than the predetermined inputs, and hence the representative data makes up only a subset of the data actually processed by the neural network. Learning is executed until association for the representative input and output data is performed adequately. When learning is concluded, the input layer and output layer show an ignition pattern decided artificially according to the inputted character data as mentioned above.

After the learning with one middle layer is completed as described above, another middle layer is added: the synapse weights with respect to the second middle layer and the adjacent layer at output side of the second middle layer (the output layer or the first middle layer) are increased, on the basis of whether more than the predetermined percentages of neurons among a plurality of corresponding neurons will ignite or not. The output side of the second middle layer will either be the output layer or the first middle layer, depending on the location the second middle layer is inserted. Accordingly, weight distribution with respect to four neural layers is obtained. Weight distribution with respect to five layers can also be obtained by the same manner.

The number of middle layers to be added is determined by the above formula (3).

When the learnings are completed, input layer 31 and output layer 33 will express the artificially determined ignition pattern according to the input characters.

Referring again to the second embodiment, after the learning of preprocessing portion 110, learning of post-processing portion 120 is performed. Referring to FIG. 3, learning of post-processing portion 120 is performed by connecting preprocessing portion 110 to the post-processing portion 120 and by increasing middle layers one by one in the same manner as the learning of preprocessing portion 110. The characters input from a video camera 10, according to the first stage of learning of post-processing portion 120 are the print characters, and post-processing portion 120 performs character recognition with respect to the clusters of the characteristics data input to input layer 34. The first stage of learning is completed when the character codes corresponding to the characters are output from output layer 36. Then handwriting characters are input to perform the second stage of learning in the same manner. At the beginning of learning with respect to the handwriting characters, characters resembling the print characters will be input. However, as the learning proceeds, various forms of characters are input so as to proceed the learning to the predetermined level.

Although the number of neurons included in a neuron group was determined to four (4), according to the embodiment as it is described with reference to FIGS. 5(a), (b) and (c), it is possible to determine preferable number of neurons as it is necessary. Also, the number of neurons in a neuron group, a, and the percentage of overlapping, v, with respect to the layers from input layer to output layer can be varied. It may be necessary that when a plurality of middle layers are prepared, the last middle layer may need to have a different number of neurons, a, and a different percentage of overlapping than the other middle layers, so that each neuron in the last middle layer will correspond perfectly to each neuron in the output layer.

The output layer 36 does not need to be structured to express the character codes in accordance with the neurons on the diagonal line. Rather, it is possible to be structured to define the recognized character according to all neurons.

According to the present embodiment, each layer is figured as a square and neurons are arranged as a neat grid. However, different arrangements may be used. For example, there may be a case that a neuron is structured by a computer memory. For this case, the physical arrangement of neurons on the memory is not to be concerned.

Furthermore, the present invention is applicable not only to the character recognition, but also to configuration recognition and voice recognition.

As mentioned above, according to the present invention, it is possible to have an effect that a data processing system can be structured with a necessary minimum number of neurons with respect to the processing object.

While this invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. A data processing system for recognizing an input image in response to an input characteristics data signal and outputting a recognition result signal, the data processing system comprising:

at least first, second and third adjacent square neural layers, each of said neural layers comprising a plurality of neurons arranged in neuron groups, each neuron group of said each neural layer having a predetermined number "a" of neurons, said predetermined number of neurons being coupled to a neuron in an adjacent neural layer, said neuron of said adjacent neural layer being responsive to said neurons of said neuron group;

wherein each neuron group of said each neural layer has at least one neuron which also belongs to an adjacent neuron group of said each neural layer so that said neuron group and said adjacent neuron group overlap by a width "v" of neurons, said overlap width "v" having a value of at least one and being less than a width of said neuron groups, said value "a" being equal for each of said first, second and third neural layers; and wherein one of said at least first, second and third neural layers outputs said recognition result signal, each of said neural layers having an arrangement such that an nth neural layer has $N_n$ number of neurons such that:

$$N_n = [(\sqrt{N_{n-1}} - v)/(\sqrt{a} - v)]^2,$$

the term "$N_{n-1}$" being a number of neurons in an adjacent (n−1)th layer, said arrangement causing said data processing system to have a minimum number of neurons.

2. A data processing system as recited in claim 1, wherein:

said at least first, second and third neural layers cooperate to form preprocessing means for generating clustering results in response to said input characteristics data signal, said preprocessing means including mutually exclusive independent data processing portions for outputting a corresponding clustering result; and said data processing system further comprising post-processing means for outputting said recognition result signal in response to said clustering results from said preprocessing means, said post-processing means including an input neural layer and a second plurality of neural layers having said arrangement between said nth and said (n−1)th neural layers each of said independent data processing portions of said preprocessing means outputting said corresponding clustering results to said input neural layer of said post-processing means.

* * * * *